US011978585B2

(12) United States Patent
Ushikubo

(10) Patent No.: US 11,978,585 B2
(45) Date of Patent: May 7, 2024

(54) COIL DEVICE AND METHOD FOR MANUFACTURING SAME AND BOBBIN FOR COIL USED THEREIN

(71) Applicant: TDS CO. LTD, Okaya (JP)

(72) Inventor: Takehiko Ushikubo, Okaya (JP)

(73) Assignee: TDS CO. LTD, Okaya (JP)

( * ) Notice: Subject to any disclaimer, the term of this patent is extended or adjusted under 35 U.S.C. 154(b) by 413 days.

(21) Appl. No.: 17/438,236

(22) PCT Filed: Mar. 13, 2019

(86) PCT No.: PCT/JP2019/010386

§ 371 (c)(1),
(2) Date: Sep. 10, 2021

(87) PCT Pub. No.: WO2020/183676

PCT Pub. Date: Sep. 17, 2020

(65) Prior Publication Data

US 2022/0189671 A1 Jun. 16, 2022

(51) Int. Cl.
*H01F 5/02* (2006.01)
*H01F 5/04* (2006.01)
(Continued)

(52) U.S. Cl.
CPC ................. *H01F 5/04* (2013.01); *H01F 5/02* (2013.01); *H01F 7/081* (2013.01); *H01F 7/127* (2013.01);
(Continued)

(58) Field of Classification Search
CPC ... H01F 5/02; H01F 5/04; H01F 7/081; H01F 7/127; H01F 27/325; H01F 2007/062;
(Continued)

(56) References Cited

U.S. PATENT DOCUMENTS

2021/0012938 A1* 1/2021 Dams .................... H01F 41/061

FOREIGN PATENT DOCUMENTS

JP 5-29132 A 2/1993
JP 2727961 B2 * 3/1998
(Continued)

*Primary Examiner* — Mohamad A Musleh
(74) *Attorney, Agent, or Firm* — Birch, Stewart, Kolasch & Birch, LLP

(57) ABSTRACT

[Object] To provide a coil device, which is small and can be easily attached to various apparatus without providing a lead wire and can be easily and inexpensively manufactured, and a method for manufacturing the coil device, and a bobbin for coil which is used in the coil device and the method.
[Solution] The bobbin for coil 1 according to the present invention is for winding a conductor wire configuring an electromagnetic coil, and contains a first bobbin body 2, a second bobbin body 3 disposed in series to the first bobbin body 2, and a connecting part 4 coupling the first bobbin body 2 and the second bobbin body 3 in series. A connector part 5 incorporating a prescribed number of terminal metal fittings 6 is provided on one axial end portion of the bobbin for coil 1.
Thus, since a relatively large space is not required for disposing lead wire(s) as in the prior art, the bobbin for coil is small, so that it can be inexpensively produced.

18 Claims, 8 Drawing Sheets

(51) Int. Cl.
*H01F 7/08* (2006.01)
*H01F 7/127* (2006.01)
*H01F 27/32* (2006.01)
*H01F 7/06* (2006.01)

(52) U.S. Cl.
CPC ..... *H01F 27/325* (2013.01); *H01F 2007/062* (2013.01)

(58) Field of Classification Search
CPC ........... H01F 2007/1692; H01F 7/1615; H01F 2005/022; H01F 7/06
See application file for complete search history.

(56) References Cited

FOREIGN PATENT DOCUMENTS

| | | | | |
|---|---|---|---|---|
| JP | 2002-289422 | A | | 10/2002 |
| JP | 2002-359110 | A | | 12/2002 |
| JP | 2008294120 | A | * | 12/2008 |
| JP | 2013-206911 | A | | 10/2013 |

* cited by examiner

[FIG. 1]
(a)
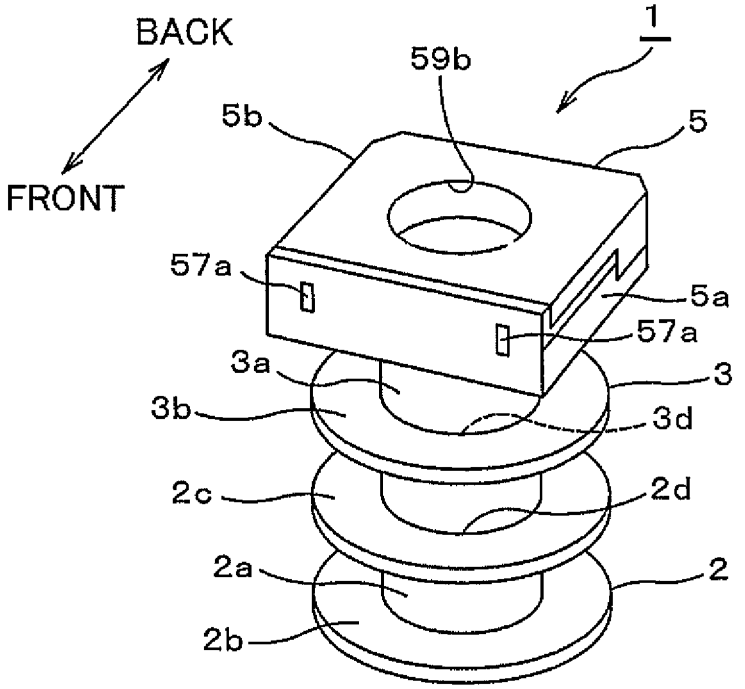
(b)
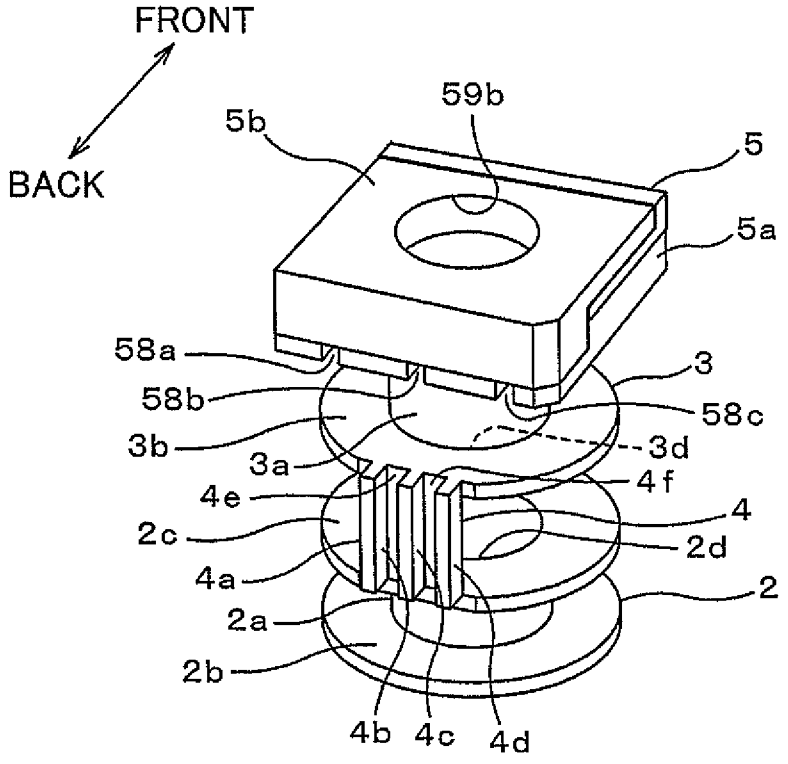

[FIG. 2]
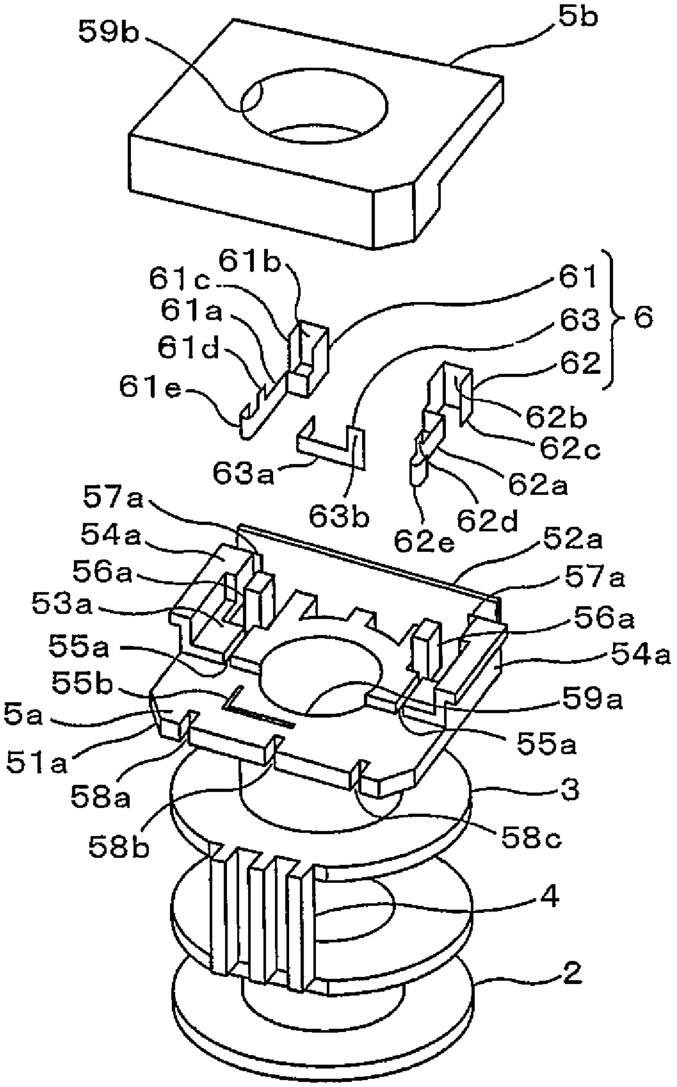

[FIG. 3]
(a)
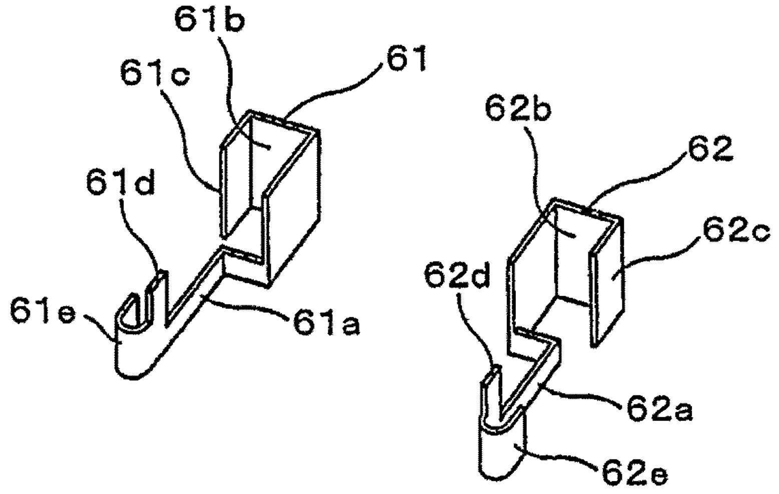
(b)
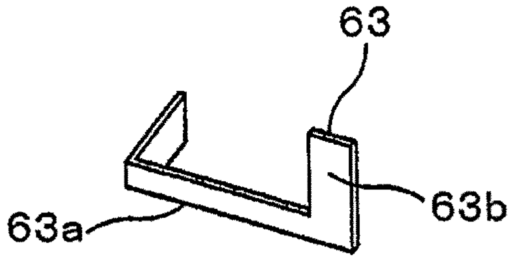
[FIG. 4]
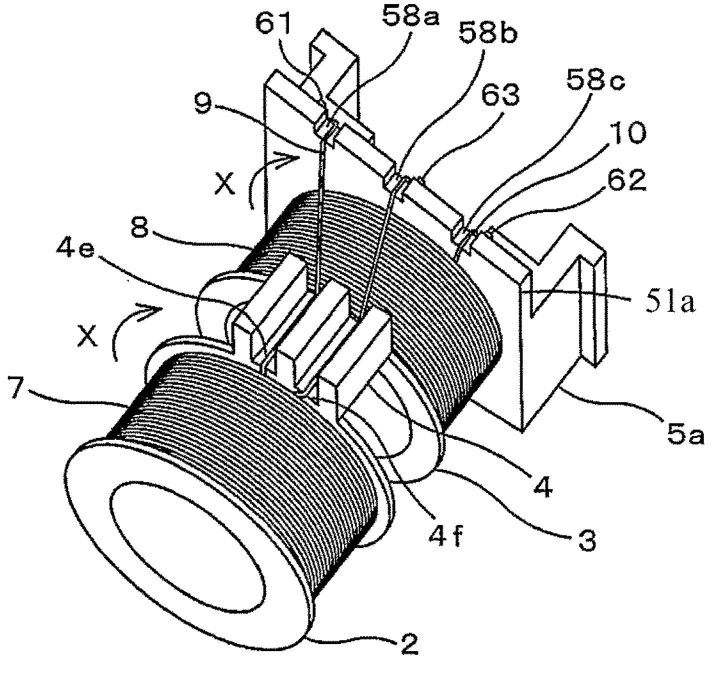

[FIG. 5]
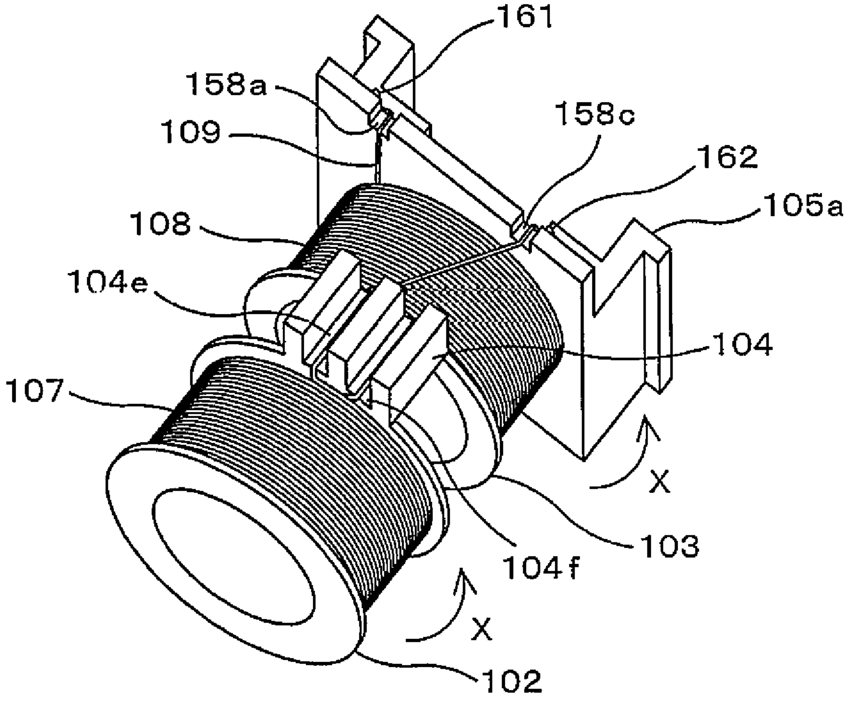
[FIG. 6]
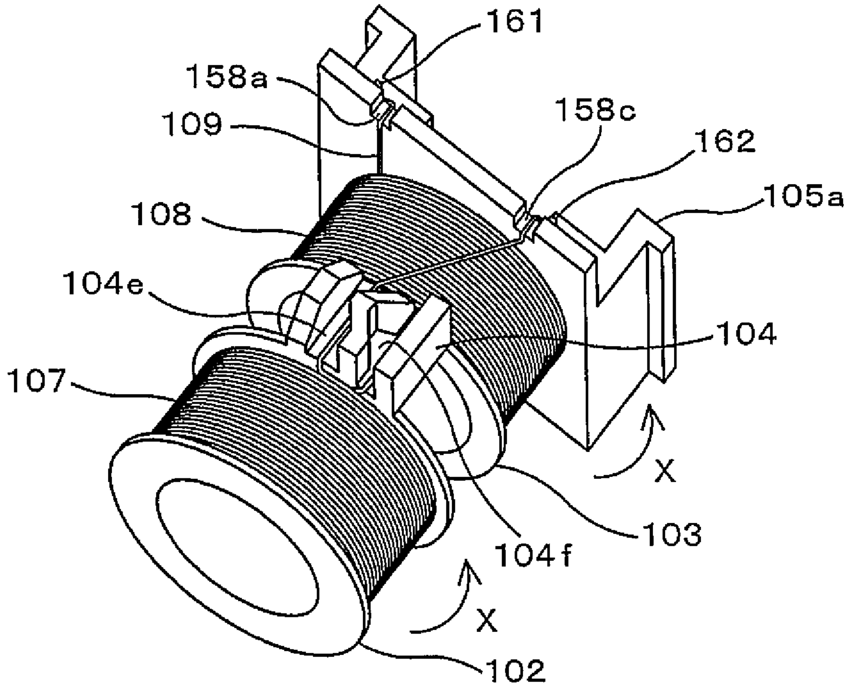

[FIG. 7]
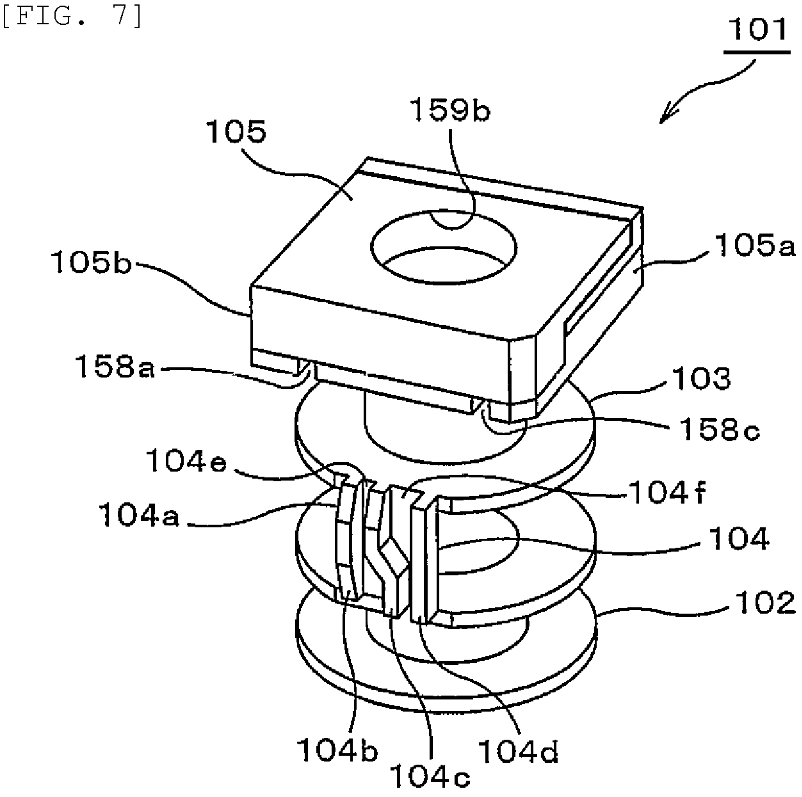

[FIG. 8]
(a)
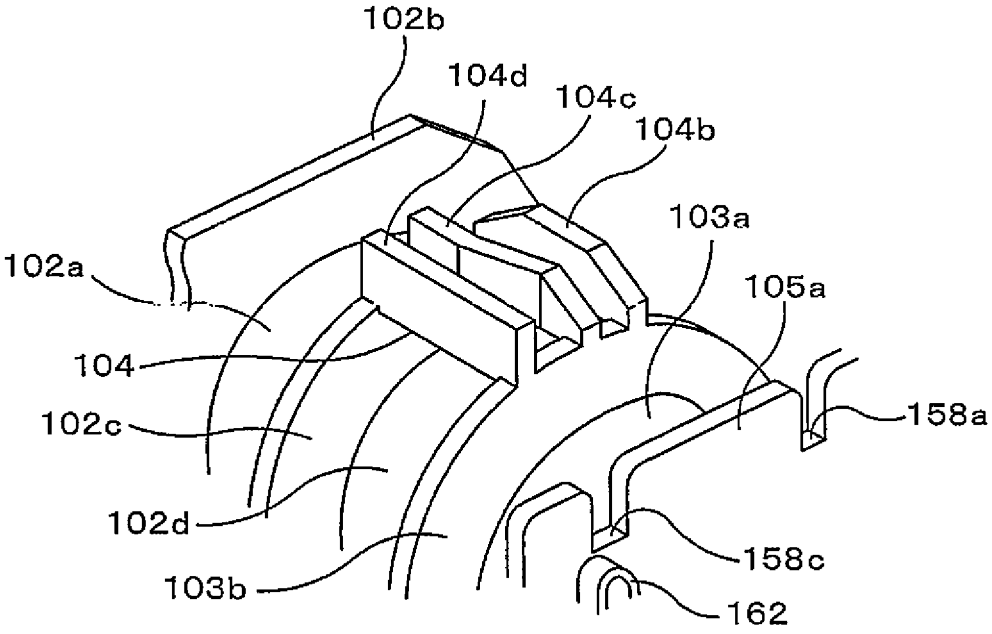
(b)
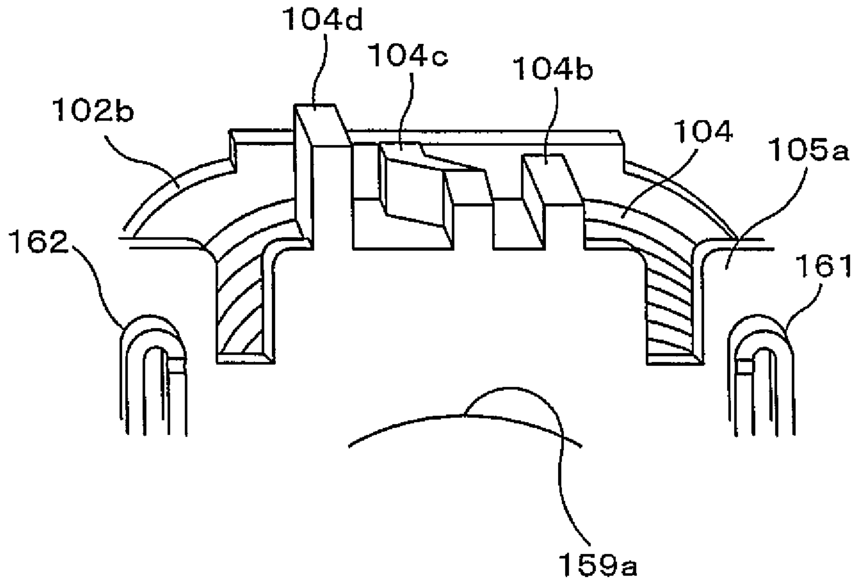

[FIG. 9]
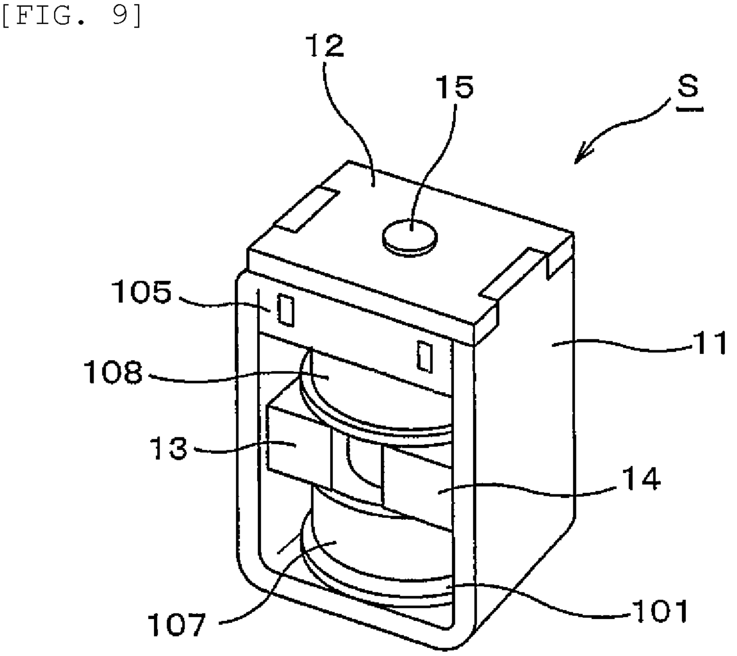

[FIG. 10]
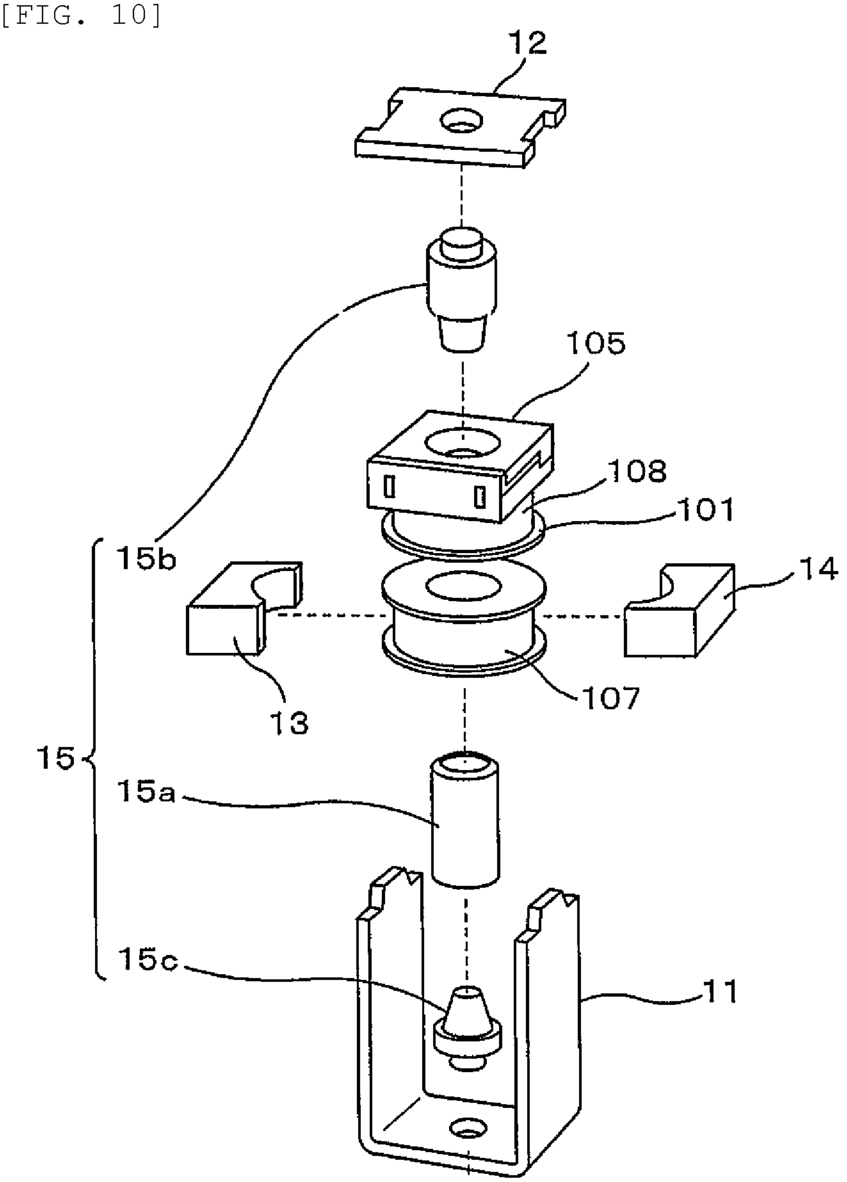

COIL DEVICE AND METHOD FOR MANUFACTURING SAME AND BOBBIN FOR COIL USED THEREIN

TECHNICAL FIELD

The present invention relates to a coil device, which can be used in various electronic apparatus, in particular, solenoid, and a method for manufacturing (producing) the coil device, and a bobbin for coil, which is used in the coil device and the method.

More specifically, the present invention relates to a coil device, which is small and can be easily attached to various apparatus without a lead wire and can be easily manufactured (produced), and a method for manufacturing the coil device, and a bobbin for coil, which is used in the coil device and the method.

BACKGROUND ART

Conventional coil device used in various electronic apparatus, for example, solenoid is configured such that when the electromagnetic coil, which is wound around an outer peripheral portion of a bobbin for the coil, is energized, a magnetic field is generated around the coil.

An example of such a solenoid is disclosed in Patent Document 1.

In Japanese Patent Kokai Application Publication No. JP2013-222806A (Patent Document 1), a flapper-type solenoid is proposed that, includes a bobbin having an electromagnetic coil that is disposed in a yoke, a magnetic core that is disposed in the bobbin, a flapper that is disposed above the yoke to be able to swing freely by a spring member engaged with the base end portion as the primary components, wherein at least the bobbin and the flapper that is disposed above the bobbin to be able to swing freely are formed from a plastic material, and the bobbin and the flapper are integrally connected through the spring member having an arc-shaped cross section.

This flapper-type solenoid is configured such that a magnetic field is generated around the coil when the coil is energized through lead wire(s).

PRIOR ART DOCUMENTS

Patent Documents

Patent Document 1: Japanese Patent Kokai Application Publication No. JP2013-222806A (Claims, Paragraph 0038, FIG. 1)

DISCLOSURE OF INVENTION

Technical Problem

Coil devices used in conventional solenoids, such as the flapper-type solenoid disclosed in Patent Document 1, are connected electrically to the opposite party (various apparatus) through terminal(s) or lead wire(s) which is connected with a winding (conductor wire) wound around its bobbin for coil.

Therefore, there is a problem in that a large space is required for providing the connector part, which has male terminal(s), or the lead wire(s) in the conventional solenoids.

Furthermore, in the conventional solenoids described above, there is a problem in that the attaching work is complicated since a step of electrically connecting the solenoid (specifically, the coil device thereof) to various apparatus through the connector part or the lead wire(s) as well as a step of attaching the solenoid body to the apparatus are required.

In light of the foregoing, an object of the present invention is to provide a coil device that is small and can be easily attached to various apparatus without a lead wire and can be easily manufactured (produced) inexpensively, and a method for manufacturing the coil device, and a bobbin for coil that is used in the coil device and the method.

Solution to Problem

To achieve the above-described object, an aspect of the present invention described in claim 1 is a bobbin for coil for winding a conductor wire configuring an electromagnetic coil that, contains a first bobbin body, a second bobbin body disposed in series to the first bobbin body, and a connecting part coupling the first bobbin body and the second bobbin body in series, wherein a connector part incorporating a prescribed number of terminal metal fittings is provided on one axial end portion of the bobbin for coil.

According to an aspect of the present invention described in claim 2, in the bobbin for coil described in claim 1, both of the first bobbin body and the second bobbin body are configured so as to have a cylindrical barrel part, around which a conductor wire is wound, and a pair of flat plate-shaped flange portions arranged oppositely on both ends of the barrel part, the connecting part is configured such that the flange portion on one end side of the first bobbin body and the flange portion on one end side of the second bobbin body are connected to each other in series, and the connector part is provided on the other end side of the first bobbin body or the other end side of the second bobbin body.

According to an aspect of the present invention described in claim 3, in the bobbin for coil described in claim 2, the flange portion on the other end side of the first bobbin body or the flange portion on the other end side of the second bobbin body is integrally formed with the connector part.

According to an aspect of the present invention described in claim 4, in the bobbin for coil described in any one of claims 1 to 3, the connecting part is formed by a plate-shaped body, and three ribs, which protrude outward in a radical direction and extend in an axis direction, are formed by forming grooves having a required depth on a center portion and both end portions in an outer face in a radical direction of the connecting part at prescribed spaces.

According to an aspect of the present invention described in claim 5, in the bobbin for coil described in claim 4, the terminal metal fittings are configured by a pair of terminal metal fittings, the ribs are formed such that the height thereof is lowered from the rib formed on the rear side of the winding direction toward the winding direction, the rib formed on the center and the rib formed on the front side of the winding direction are additionally configured such that the end portion of the connector part side is inclined toward the inner side in the radial direction, and the rib formed on the center is additionally configured such that the end portion of the connector part side is deflected toward a front side of the winding direction.

According to an aspect of the present invention described in claim 6 is a coil device that, contains the bobbin for coil described in any one of claims 1 to 5, a first electromagnetic coil formed on the outer peripheral portion of the barrel part of the first bobbin body, and a second electromagnetic coil formed on the outer peripheral portion of the barrel part of the second bobbin body.

According to an aspect of the present invention described in claim 7, in the coil device described in claim 6, the connector part has a first terminal metal fitting connected electrically to one end of a conductor wire configuring the first electromagnetic coil, a second terminal metal fitting connected electrically to the other end of the conductor wire configuring the first electromagnetic coil and one end of a conductor wire configuring the second electromagnetic coil, and a third terminal metal fitting connected electrically to the other end of the conductor wire configuring the second electromagnetic coil.

According to an aspect of the present invention described in claim 8, in the coil device described in claim 6, the first electromagnetic coil and the second electromagnetic coil are formed continuously with one conductor wire, the terminal metal fittings are configured by a pair of terminal metal fittings, and the conductor wire has one end connected electrically to one terminal metal fitting and the other end connected electrically to the other terminal metal fitting.

According to an aspect of the present invention described in claim 9 is a method for manufacturing a coil device that contains a step of connecting one terminal metal fitting of a pair of the terminal metal fittings provided in the connector part of the bobbin for coil described in claim 5 electrically to a winding-start end portion of a conductor wire, a step of winding a conductor wire, which is led out from the winding-start end portion of the conductor wire, around the outer peripheral portion of the barrel part of the second bobbin body to form a second electromagnetic coil, and then running the conductor wire through a groove between the rib formed on the front side of the winding direction and the rib formed on the center, and further winding the conductor wire around the outer peripheral portion of the barrel part of the first bobbin body to form a first electromagnetic coil, and a step of running a winding-finish end portion through a groove between the rib formed on the center and the rib formed on the rear side of the winding direction to connect electrically to the other terminal metal fitting.

According to an aspect of the present invention described in claim 10 is a solenoid that, contains the coil device described in any one of claims 6 to 8, or the coil device manufactured by the method described in claim 9.

Advantageous Effects of Invention

The bobbin for coil according to the present invention is for winding a conductor wire configuring an electromagnetic coil, and contains a first bobbin body, a second bobbin body disposed in series to the first bobbin body, and a connecting part coupling the first bobbin body and the second bobbin body in series. In this bobbin for coil, a connector part incorporating a prescribed number of terminal metal fittings is provided on one axial end portion of the bobbin for coil.

Thus, this solenoid is configured such that the connector part incorporating a prescribed number of terminal metal fittings is provided on one axial end portion of the bobbin for coil, so that it is not required to provide lead wire(s) for connecting electrically to various apparatus as in the prior art, and the bobbin for coil is small and is easily attached to various apparatus and can be easily produced inexpensively.

In the bobbin for coil, the first bobbin body and the second bobbin body may be configured so as to have a cylindrical barrel part, around which a conductor wire is wound, and a pair of flat plate-shaped flange portions arranged oppositely on both ends of the barrel part, and additionally the connecting part may be configured such that the flange portion on one end side of the first bobbin body and the flange portion on one end side of the second bobbin body are connected to each other in series, and the connector part may be integrally formed with the other end side of the first bobbin body or the other end side of the second bobbin body.

Such a configuration allows the size of the bobbin for coil to be reduced further.

Furthermore, in the bobbin for coil, the terminal metal fittings may be configured by a pair of terminal metal fittings.

By such a configuration, one conductor wire can be continuously wound around both of the barrel part of the first bobbin body and the barrel part of the second bobbin body to form electromagnetic coils. Therefore, a coil device can be more inexpensively produced.

Furthermore, in the bobbin for coil, the connecting part may be formed by a plate-shaped body, and additionally three ribs, which protrude outward in a radical direction and extend in an axis direction, may be formed by forming grooves having a required depth on a center portion and both end portions in an outer face in a radical direction of the connecting part at prescribed spaces.

In this case, the ribs may be formed such that the height thereof is lowered from the rib formed on the rear side of the winding direction toward the winding direction, and additionally the rib formed on the center and the rib formed on the front side of the winding direction may be configured such that the end portions of the connector part side are inclined toward the inner side in the radial direction, and the rib formed on the center may be configured such that the end portion of the connector part side is deflected toward a front side of the winding direction.

By such a configuration, one conductor wire can be continuously wound around both of the barrel part of the first bobbin body and the barrel part of the second bobbin body automatically by using a prescribed winding device.

The coil device according to the present invention contains the bobbin for coil described above, a first electromagnetic coil formed on the outer peripheral portion of the barrel part of the first bobbin body, and a second electromagnetic coil formed on the outer peripheral portion of the barrel part of the second bobbin body. Thus, in the coil device, it is not required to provide lead wire(s) for connecting electrically to various apparatus as in the prior art, and therefore, the coil device is small and is easily attached to various apparatus and can be easily produced inexpensively.

In case that the terminal metal fittings are configured by a pair of terminal metal fittings, since the production (manufacture) of the coil device can be conducted by a method contains a step of connecting electrically and fixing one terminal metal fitting of a pair of the terminal metal fittings to a winding-start end portion of a conductor wire; a step of winding a conductor wire, which is led out from the winding-start end portion of the conductor wire, around the outer peripheral portion of the barrel part of the second bobbin body to form a second electromagnetic coil, and then running the conductor wire through a groove between the rib formed on the front side of the winding direction and the rib formed on the center, and further winding the conductor wire around the outer peripheral portion of the barrel part of the first bobbin body to form a first electromagnetic coil; and a step of running a winding-finish end portion through a groove between the rib formed on the center and the rib formed on the rear side of the winding direction to connect electrically and fix to the other terminal metal fitting, the production of the coil device is very easy.

The coil device according to the present invention can be used in various apparatus. When applying this coil device to a solenoid, it is not required to provide lead wire(s), so that miniaturization of the solenoid is achieved.

BRIEF DESCRIPTION OF DRAWINGS

FIG. 1 is a perspective view illustrating an example of a bobbin for coil according to the present invention: (a) is a perspective view formed by viewing it from a front side; (b) is a perspective view formed by viewing it from a back side.

FIG. 2 is an exploded perspective view illustrating an example of connector part provided with the bobbin for coil illustrated in FIG. 1.

FIG. 3 is an approximately explanatory drawing explaining an example of terminal metal fittings configuring the connector part illustrated in FIG. 2: (a) illustrates a pair of connecting terminals; (b) illustrates a relay terminal.

FIG. 4 is an explanatory drawing explaining an example of a coil device configured by winding a conductor wire around the bobbin for coil illustrated in FIG. 1: In the coil device, the case cover 5*b* configuring the connector part 5 is detached, and the conductor wires 9 and 10 are wound around the barrel parts 2*a* and 3*a* in the winding direction X.

FIG. 5 is an explanatory drawing explaining another example of a coil device according to the present invention: In the coil device, the case cover 105*b* configuring the connector part 105 is detached, and one conductor wire 109 is wound around the barrel parts 102*a* and 103*a* in the winding direction X.

FIG. 6 is an explanatory drawing explaining yet another example of a coil device according to the present invention: In the coil device, the case cover 105*b* configuring the connector part 105 is detached, and one conductor wire 109 is wound around the barrel parts 102*a* and 103*a* in the winding direction X.

FIG. 7 is a perspective view formed by viewing a bobbin for coil configuring the coil device illustrated in FIG. 6 from a back side.

FIG. 8 is an explanatory drawing explaining a connecting part of the bobbin for coil illustrated in FIG. 7.

FIG. 9 is a perspective view illustrating an example of a solenoid having the coil device illustrated in FIG. 5.

FIG. 10 is an exploded perspective view illustrating the solenoid illustrated in FIG. 9.

DESCRIPTION OF EMBODIMENTS

Hereinafter, the bobbin for coil according to the present invention, and the coil device having the bobbin, and the method for manufacturing the coil device will be described in detail below with reference to the accompanying drawings.

Note that the present invention is not limited only to examples disclosed herein, and various modifications can be made thereto without changing the gist of the present invention.

As illustrated in FIG. 1, a bobbin for coil 1 according to the present invention contains a first bobbin body 2, a second bobbin body 3 disposed in series (in alignment in an axial direction) to the first bobbin body 2, and a connecting part 4 coupling the first bobbin body 2 and the second bobbin body 3 in series. And, a connector part 5, which incorporates a prescribed number of terminal metal fittings, is provided on one axial end portion of the bobbin for coil.

Note that in the Examples, the bobbin for coil 1 is formed from an insulating synthetic resin.

As illustrated in FIG. 1, the first bobbin body 2 is configured by a cylindrical barrel part (first barrel part) 2*a* around which the conductor wire is wound, and a pair of flat plate-shaped flange portions 2*b* and 2*c* which are formed protruding outward in a radical direction from both axial end of the barrel part 2*a*.

In the Examples, the first bobbin body 2 is configured such that the flange portion 2*c* on one end side of the first bobbin body is connected to the flange portion 3*b* on one end side of the second bobbin body 3 through the connecting part 4.

The second bobbin body 3 has the approximately same configuration as the first bobbin body 2 except that one flange portion of a pair of flat plate-shaped flange portions is integrally formed with a case body 5*a* configuring the connector part 5.

That is, in FIG. 1, the second bobbin body 3 is configured by a cylindrical barrel part (second barrel part) 3*a* around which the conductor wire is wound, a flat plate-shaped flange portion 3*b* formed protruding outward in a radical direction from one axial end of the barrel part 3*a*, and a case body 5*a* formed on the other end.

In FIGS. 1 and 2, both of the first barrel part 2*a* and the second barrel part 3*a* are cylindrical, and have insertion holes 2*d* and 3*d*, which are formed to penetrate through the center portions thereof along the axial direction, respectively.

In case that a coil device for solenoid is configured by winding a conductor wire around the bobbin for coil 1, the insertion holes 2*d* and 3*d* are used for arranging the iron core (for example, plunger) or the like inside thereof.

As illustrated in FIG. 1, the connecting part 4 allows one end portion (2*c* in FIG. 1) of the first bobbin body 2 and one end portion (3*b* in FIG. 1) of the second bobbin body 3 to be coupled to each other in series.

In FIG. 1, the connecting part 4 is configured by a connecting part body 4*a*, which is formed by a plate-shaped body having a required size. On a center portion and both end portions in an outer face in a radical direction of the connecting part, ribs 4*b*, 4*c* and 4*d*, which protrude outward in a radical direction and extend in an axis direction, are formed by forming guide grooves 4*e* and 4*f* having a required depth, at prescribed spaces.

The guide grooves 4*e* and 4*f* configure a conductor wire-guide portion for guiding one end (winding-start side) and the other end (winding-finish side) of a conductor wire, which is wound around an outer peripheral portion of the barrel part of the bobbin body (first bobbin body 2 in FIG. 1) disposed in a position apart from the connector part 5, to terminal metal fitting 6, respectively.

Thus, the ribs formed on both ends (ribs 4*b* and 4*d*) allow the winding of the conductor wire to be easy, and allow the position of the conductor wire to be stabled, and allow the damage of the conductor wire due to exterior influences to be prevented.

Note that the rib (rib 4*c*) formed on a center can bring to an insulating state by isolating between two conductor wires which are disposed on an outer face in a radical direction of the connecting part 4; however, the rib is not always required as long as an insulating state is formed, for example, by covering the conductor wire(s) itself.

The connector part 5 is provided on one axial end of the bobbin for coil, and as illustrated in FIG. 2, the connector part is divided to two parts in a vertical direction to house various members or the like. In this example, the connector part is configured by a case body 5*a* opened in back-side end portions of both side faces and back side face and upper portion, a prescribed number of terminal metal fitting 6 provided on the case body 5*a*, and a case cover 5*b* which closes an opening portion of the case body 5*a* while pressing the terminal metal fitting 6 from the above to fix the terminal metal fitting.

Note that in FIGS. 1 and 2, the case body 5*a* configuring the connector part 5 is configured to be integrally formed with the flange portion of the other end side of the second bobbin body 3; however, the case body 5*a* and the flange portion may not necessarily be integrally formed, and they may be separately formed respectively.

Furthermore, in FIGS. 1 and 2, the case body 5*a* configuring the connector part 5 is provided on the other end side of the second bobbin body 3; however, a provided position may be selected according to the use or the like of the bobbin for coil as long as the case body is provided on one axial end portion of the bobbin for coil.

As illustrated in FIG. 2, in the Examples, the case body 5*a* is configured by a bottom face 51*a*, a front wall 52*a* formed to erect from a front end edge of the bottom face 51*a*, a stepped portion 53*a* having a required height which is formed from a center portion of the bottom face 51*a* to the front wall 52*a*, and a pair of sidewalls 54*a* and 54*a* erected on both end edges of the stepped portion 53*a*.

In FIG. 2, press-in grooves 55*a* and 55*a*, which are formed by notching in a required depth so as to match with each shape of the connecting terminals 61 and 62, are provided in right and left end portions of the stepped portion 53*a*.

Furthermore, in FIG. 2, engaging projections 56*a* and 56*a*, which engage with engaging portion 61*b* (or 62*b*) formed on the front edge sides of the connecting terminals 61 and 62, are integrally provided attaching in the front end sides of the press-in grooves 55*a* and 55*a*.

In FIG. 2, a press-in groove 55*b*, which is formed by notching in a required depth so as to match with a shape of a terminal body 63*a* of the relay terminal 63, is provided in a center portion of rear end of the bottom face 51*a*.

In FIGS. 1 and 2, lateral side opening portions 57*a* and 57*a*, which have a rectangular shape in plan view, are formed to penetrate through right and left end portions of the front wall 52*a* of the case body 5*a*.

The lateral side opening portions 57*a* and 57*a* are used in inserting male terminals, which are provided with various apparatus, into the connecting terminals 61 and 62, which are configured by a female terminal, when the male terminals are electrically contacted with the connecting terminals.

Furthermore, as illustrated in FIG. 2, conductor wire-guide portions 58*a*, 58*b* and 58*c*, which guide a conductor wire to the terminal metal fitting 6 (connecting terminals 61 and 62, and relay terminal 63), are formed by notching the back side of the case body 5*a* from the outer circumferential side thereof in a prescribed depth.

In FIG. 2, the terminal metal fitting 6 is configured by a pair of connecting terminals 61 and 62 and a relay terminal 63, and all of their terminals are formed from a metal having conductivity.

Both of the connecting terminals 61 and 62 are formed from a material having conductivity, and are configured to have the one end connected electrically to a conductor wire and the other end connected electrically by contacting with contact portions of external terminals (not illustrated) provided with the external connector of the opposite party (various apparatus).

Note that in the Examples, the connecting terminals 61 and 62 are formed from a material having spring properties as well as conductivity; however, the configuration of connecting terminal is not particularly limited as long as the connecting terminal is formed from at least a material having conductivity so as to connect electrically to the external terminal of the external connector as a terminal.

In FIGS. 2 and 3(*a*), the connecting terminals 61 and 62 configure female terminals which are formed symmetrical with each other, and both of them are formed by bending the punching member, which is formed by punching a plate-like body into a prescribed shape, in the plate thickness direction. The connecting terminal 61 (or 62) is configured by terminal body 61*a* (or 62*a*) held in the press-in grooves 55*a* of the case body 5*a*, engaging portion 61*b* (or 62*b*) formed on front end portions in a longitudinal direction of the terminal body 61*a* (or 62*a*), elastic contact portion 61*c* (or 62*c*) formed on tip portions of the engaging portion 61*b* (or 62*b*), and conductor wire-connecting portion 61*d* (or 62*d*) formed on rear edge side in a longitudinal direction of the terminal body 61*a* (or 62*a*).

The engaging portion 61*b* (or 62*b*) is formed by bending the front end portion in a longitudinal direction of the terminal body 61*a* (or 62*a*), and is formed in a U-shaped opening outwardly (leftwardly in the engaging portion 61*b*, rightwardly in the engaging portion 62*b*, in FIG. 3(*a*)). The engaging portion 61*b* (or 62*b*) engages with the engaging projection 56*a* of the case body 5*a*.

The elastic contact portion 61*c* (or 62*c*) is formed by bending the tip portions of the engaging portion 61*b* (or 62*b*) vertically backward to make them parallel to the terminal body 61*a* (or 62*a*), and contacts with external terminal of the external connector.

Thus, the elastic contact portion 61*c* (or 62*c*) is elastically displaceable in the plate thickness direction, and can contact elastically with the external terminal (male terminal), which is inserted from the lateral side opening portion 57*a*.

The conductor wire-connecting portion 61*d* (or 62*d*) is formed protruding upward from the rear edge side in a longitudinal direction of the terminal body 61*a* (or 62*a*) to connect electrically to a conductor wire.

Furthermore, conductor wire-guide portion 61*e* (or 62*e*) is formed by folding back the extension piece, which is protruded from the rear end edge of the terminal body 61*a* (or 62*a*), to guide a conductor wire.

As described above, the press-in grooves 55*a* and 55*a*, into which the connecting terminals 61 and 62 are pressed, are provided in right and left end portions of the stepped portion 53*a* of the case body 5*a*. The press-in grooves 55*a* and 55*a* are formed by notching in a prescribed depth so as to match with each shape of the connecting terminals. The engaging projections 56*a* and 56*a*, which engage with engaging portions 61*b* and 62*b*, are formed protruding upward in the press-in grooves 55*a* and 55*a*.

Thus, the connecting terminal 61 (or 62) is held in the case body 5*a* by pressing the terminal body 61*a* (or 62*a*) into the press-in groove 55*a* in a state where the engaging portion 61*b* (or 62*b*) engages with the engaging projection 56*a*.

Note that in the Examples, a female terminal is selected for a connecting terminal; however, an embodiment of the terminal may be selected according to an embodiment of the external terminal provided with the apparatus to be attached.

As illustrated in FIGS. 2 and 3(*b*), the relay terminal 63 is configured by a terminal body 63*a*, which is formed in an inverted-L shape in a plan view by bending one end edge in a longitudinal direction of the punching member formed by punching a plate-like body into a prescribed shape, and a conductor wire-connecting portion 63*b*, which is formed protruding upward from the other end edge side in a longitudinal direction of the punching member.

The terminal body 63*a* is held in the press-in groove 55*b* of the case body 5*a*.

The conductor wire-connecting portion 63*b* is for electrically connecting to a conductor wire. In FIG. 4, the conductor wire-connecting portion is electrically connected to one end of a conductor wire, which is wound around the barrel part 2*a* of the first bobbin body 2, and one end of a conductor wire, which is wound around the barrel part 3*a* of the second bobbin body 3.

As described above, in FIG. 2, the press-in groove 55*b*, into which the terminal body 63*a* of the relay terminal 63 is pressed, is provided in the center portion of rear end of the bottom face 51*a* of the case body 5*a* so as to match with the shape of the terminal body.

Thus, the relay terminal 63 is held in the case body 5*a* by pressing the terminal body 63*a* into the press-in groove 55*b*.

Note that in the Examples, the connecting terminals 61 and 62 and the relay terminal 63 are attached to the case body 5*a* by pressing their terminals into the press-in grooves 55*a*, 55*a* and 55*b*; however, the connecting terminals 61 and 62 and the relay terminal 63 can be provided in the case body 5*a* by using a known method such as a method of burying the terminal metal fitting into the case body through integral molding.

In FIG. 2, a through hole 59*a* is formed in a vertical direction on a center portion of the case body 5*a*.

In addition, a through hole 59*b* is formed on a center portion of the case cover 5*b* so as to correspond to the through hole 59*a*, which formed on a center portion of the case body 5*a*. As illustrated in FIG. 1, when the case body 5*a* is coupled with the case cover 5*b*, through holes, which are communicated with each other, are formed in a vertical direction.

In case that a coil device for solenoid is configured by winding a conductor wire around the bobbin for coil 1, the through holes are used for arranging the iron core (for example, plunger) or the like inside thereof.

As illustrated in FIG. 4, the bobbin for coil having such configuration configures a coil device by winding the electromagnetic coil 7, which is formed by a conductor wire 9, around an outer peripheral portion of the barrel part 2*a* configuring the first bobbin body 2, and by winding the electromagnetic coil 8, which is formed by a conductor wire 10, around an outer peripheral portion of the barrel part 3*a* configuring the second bobbin body 3.

The coil device can be produced, for example, by connecting one end (winding-start end portion) of a conductor wire 9 electrically to one connecting terminal 61, which is provided with the connector part 5; and further drawing a conductor wire, which is led out from the winding-start end portion of the conductor wire 9, in the order of the conductor wire-guide portion 58*a* and the guide groove 4*e*; and then winding it around the barrel part 2*a* of the bobbin body (first bobbin body) 2, which does not have a connector part 5, in a winding direction X to draw in the order of the guide groove 4*f* and the conductor wire-guide portion 58*b*; and connecting the other end (winding-finish end portion) electrically to the relay terminal 63 provided in the center; and thereafter connecting one end (winding-start end portion) of an another conductor wire 10 electrically to the other connecting terminal 62; and further drawing a conductor wire, which is led out from the winding-finish end portion of the conductor wire 9, in the conductor wire-guide portion 58*b*; and then winding it around the barrel part 3*a* of the bobbin body (second bobbin body) 3, which has the connector part 5, in a winding direction X to draw the conductor wire-guide portion 58*c*; and connecting the other end (winding-finish end portion) electrically to the relay terminal 63 provided in the center.

In addition, in another embodiment, as illustrated in FIG. 5, one conductor wire 109 may be wound around both of the outer peripheral portion of the barrel part 102*a*, which configures the first bobbin body 102, and the outer peripheral portion of the barrel part 103*a*, which configures the second bobbin body 103 to configure a coil device.

In this case, a terminal metal fitting configuring a connector part 105 can be configured by only a pair of connecting terminals 161 and 162. Thus, a coil device can be easily produced (manufactured) inexpensively, only by connecting one end (winding-start end portion) of a conductor wire 109, which configures each electromagnetic coils 107 and 108, electrically to one connecting terminal 161, and connecting the other end (winding-finish end portion) electrically to the other connecting terminal 162.

The winding one conductor wire 109 to both of the outer peripheral portions of the barrel parts 102*a* and 103*a* may be conducted by hand or by using a prescribed winding device.

In the case of using the winding device, as illustrated in FIGS. 6 to 8, it is preferable that the height of the rib 104*d*, which is formed on a rear side of the winding direction X, among the ribs formed protruding from an outer face in a radical direction of the connecting part is at least set to such a height that the conductor wire wound in the winding direction X is caught to a sidewall of the rib 104*d* and additionally the height of each rib is lowered from the rib 104*d* formed on the rear side of the winding direction X toward the winding direction X (front side).

As illustrated in FIGS. 6 to 8, it is more preferable that in addition to the configurations described above, the rib 104*c* formed on the center and the rib 104*b* formed on the front side of the winding direction X are respectively formed such that the end portions of the connector part 105 side are inclined downward to the connector part 105 (inclined toward the inner side in the radial direction) and additionally the end portion of the connector part 105 side in the rib 104*c* formed on the center is deflected toward a front side of the winding direction X.

Such a configuration allows the conductor wire 109 to be caught to an inside sidewall of the rib 104*d* when drawing the conductor wire 109 in the guide groove 104*f*, thus the conductor wire 109 is easily disposed in the guide groove 104*f*.

As illustrated in FIGS. 6 to 8, it is further preferable that in addition to the configurations described above, the end portion on the opposite side of the connector part 105, in the rib 104*c* formed on the center, is not inclined downwards, and the end portion on the opposite side of the connector part 105, in the rib 104*b* formed on the front side of the winding direction X, is inclined downward to a direction apart from the connector part 105, and the rib 104*c* formed on the center is configured such that the end portion on the opposite side of the connector part 105 therein is deflected toward a rear side of the winding direction X.

Such a configuration allows the conductor wire 109 to be caught to a rib 104*b*-side sidewall of the rib 104*c* when drawing the conductor wire 109 in the guide groove 104*e*, thus the conductor wire 109 is easily disposed in the guide groove 104*e*.

Thus, the coil device can be produced by hand or by using a prescribed winding device, for example, by connecting one end (winding-start end portion) of a conductor wire 109 electrically to one connecting terminal 161, which is provided with the connector part 105; and further drawing a conductor wire, which is led out from the winding-start end portion of the conductor wire 109, in the conductor wire-guide portion 158*a*; and then winding it around the barrel part 103*a* of the bobbin body (second bobbin body) 103, which has a connector part 105, in a winding direction X to draw in the guide groove 104*f*; and additionally winding it around the barrel part 102*a* of the bobbin body (first bobbin body) 102, which does not have the connector part 105, in a winding direction X to draw in the order of the guide groove 104*e* and the conductor wire-guide portion 58*c*; and connecting the other end (winding-finish end portion) electrically to the other connecting terminal 162.

Note that in the Examples, the conductor wire is wound around the barrel part 103*a* of the second bobbin body 103 in a winding direction X first, and then is wound around the barrel part 102*a* of the first bobbin body 102 in a winding direction X; however, the order, around which the conductor wire is wound, and the winding direction are particularly limited. A conductor wire may be wound around the barrel part 102*a* of the first bobbin body 102 first. The winding direction may be a direction opposite to the X direction.

The coil device having such configuration is used as a coil device for various electronic apparatus, in particular, solenoid.

FIGS. 9 and 10 illustrate an example of a solenoid using the coil device illustrated in FIG. 5.

In FIGS. 9 and 10, a solenoid S contains a yoke 11 having a U-shaped cross section, a bobbin for coil 101 installed inside a central portion of the yoke 2, an electromagnetic coils 107 and 108, which are wound around the bobbin for coil 101, a pair of magnets 13 and 14, which are attached to an axial center portion of the bobbin for coil 101, an iron core 15 disposed inside the bobbin for coil 101, and a yoke lid 12 closing the upper opening portion of the yoke 11.

As illustrated in FIG. 10, the iron core 15 is configured by a plunger 15*a* mounted inside the bobbin for coil 101 to be able to oscillate freely in a vertical direction, and a pair of stoppers 15*b* and 15*c* which are disposed on both ends of the plunger for preventing the plunger 15*a* from deviating from the inside of the yoke 11.

The plunger 15*a* and the stoppers 15*b* and 15*c* are formed from iron or the like, and all of them have a cylindrical shape and have an outer diameter approximately equal to the inner diameter of the barrel part (outer diameter of the through holes) of the bobbin for coil 101.

The pair of stoppers 15*b* and 15*c* are configured to have one side (15*b* in FIG. 10) fixed to the yoke lid 12 and the other side (15*c* in FIG. 10) fixed to the yoke 11.

The solenoid S having such a configuration is connected to a power source of various apparatus. In the solenoid S, in a state where an energization is not conducted, by a pair of magnets 13 and 14 provided at an axial center portion of the coupling body 104, the plunger 15*a* is disposed in the vicinity of the center portion in a stationary state. On the other hand, when one electromagnetic coil of electromagnetic coils, which are wound around the barrel parts of the bobbin bodies coupled through the coupling body 104, is energized, the plunger 15*a* is oscillated freely in the direction of the electromagnetic coil, which is energized.

INDUSTRIAL APPLICABILITY

The bobbin for coil according to the present invention enables to produce (manufacture) inexpensively a small coil device, which is easily attached to various apparatus without providing a lead wire by using the bobbin for coil. Thus, the bobbin for coil can be used in a wide range of fields.

REFERENCE SIGNS LIST

1, 101 Bobbin for coil
2, 102 First bobbin body
2*a*, 102*a* First barrel part
2*b*, 102*b* Flange portion (lower side)
2*c*, 102*c* Flange portion (upper side)
2*d*, 102*d* Insertion hole
3, 103 Second bobbin body
3*a*, 103*a* Second barrel part
3*b*, 103*b* Flange portion (lower side)
3*d*, 103*d* Insertion hole
4, 104 Connecting part
4*a*, 104*a* Connecting part body
4*b*, 104*b* First rib
4*c*, 104*c* Second rib
4*d*, 104*d* Third rib
4*e*, 104*e* Guide groove of conductor wire
4*f*, 104*f* Guide groove of conductor wire
5, 105 Connector part
5*a*, 105*a* Case body
5*b*, 105*b* Case cover
51*a* Bottom face
51*b* Upper face
52*a* Front wall
53*a* Stepped portion
54*a* Sidewall
55*a* Press-in groove
56*a* Engaging projection
57*a* Lateral side opening portion
58*a*, 58*b*, 58*c* Conductor wire-guide portion
59*a*, 59*b* Through hole
6, 106 Terminal metal fitting
61, 161 Connecting terminal
61*a*, 161*a* Terminal body
61*b*, 161*b* Engaging portion
61*c*, 161*c* Elastic contact portion
61*d*, 161*d* Conductor wire-connecting portion
61*e*, 161*e* Conductor wire-guide portion
62, 162 Connecting terminal
62*a*, 162*a* Terminal body
62*b*, 162*b* Engaging portion
62*c*, 162*c* Elastic contact portion
62*d*, 162*d* Conductor wire-connecting portion
62*e*, 162*e* Conductor wire-guide portion
63 Relay terminal
7, 107 First electromagnetic coil
8, 108 Second electromagnetic coil
9, 10, 109 Conductor wire
11 Yoke
12 Yoke lid

13, 14 Magnet
15 Iron core
S Solenoid
X Winding direction

The invention claimed is:

1. A bobbin for coil for winding a conductor wire configuring an electromagnetic coil, comprising a first bobbin body, a second bobbin body disposed in series to the first bobbin body, and a connecting part coupling the first bobbin body and the second bobbin body in series, wherein a connector part incorporating a prescribed number of terminal metal fittings is provided on one axial end portion of the bobbin for coil, and ribs, which protrude outward in a radical direction and extend in an axis direction, are formed by forming grooves having a required depth on a center portion and both end portions in an outer face in a radical direction of the connecting part at prescribed spaces.

2. The bobbin for coil according to claim 1, wherein both of the first bobbin body and the second bobbin body are configured so as to have a cylindrical barrel part, around which a conductor wire is wound, and a pair of flat plate-shaped flange portions arranged oppositely on both ends of the barrel part, the connecting part is configured such that the flange portion on one end side of the first bobbin body and the flange portion on one end side of the second bobbin body are connected to each other in series, and the connector part is provided on the other end side of the first bobbin body or the other end side of the second bobbin body.

3. The bobbin for coil according to claim 2, wherein the flange portion on the other end side of the first bobbin body or the flange portion on the other end side of the second bobbin body is integrally formed with the connector part.

4. The bobbin for coil according to claim 3, wherein the connecting part is formed by a plate-shaped body, and the ribs to be formed are three.

5. A coil device comprising the bobbin for coil described in claim 3, a first electromagnetic coil formed on the outer peripheral portion of the barrel part of the first bobbin body, and a second electromagnetic coil formed on the outer peripheral portion of the barrel part of the second bobbin body.

6. The bobbin for coil according to claim 2, wherein the connecting part is formed by a plate-shaped body, and the ribs to be formed are three.

7. A coil device comprising the bobbin for coil described in claim 2, a first electromagnetic coil formed on the outer peripheral portion of the barrel part of the first bobbin body, and a second electromagnetic coil formed on the outer peripheral portion of the barrel part of the second bobbin body.

8. The bobbin for coil according to claim 1, wherein the connecting part is formed by a plate-shaped body, and the ribs to be formed are three.

9. The bobbin for coil according to claim 8, wherein the terminal metal fittings are configured by a pair of terminal metal fittings, the ribs are formed such that the height thereof is lowered from the rib formed on the rear side toward the winding direction, the rib formed on the center and the rib formed on the front side of the winding direction are additionally configured such that the end portion of the connector part side is inclined toward the inner side in the radial direction, and the rib formed on the center is additionally configured such that the end portion of the connector part side is deflected toward a front side of the winding direction.

10. A method for manufacturing a coil device comprising a step of connecting one terminal metal fitting of a pair of the terminal metal fittings provided in the connector part of the bobbin for coil described in claim 9 electrically to a winding-start end portion of a conductor wire, a step of winding a conductor wire, which is led out from the winding-start end portion of the conductor wire, around the outer peripheral portion of the barrel part of the second bobbin body to form a second electromagnetic coil, and then running the conductor wire through a groove between the rib formed on the front side of the winding direction and the rib formed on the center, and further winding the conductor wire around the outer peripheral portion of the barrel part of the first bobbin body to form a first electromagnetic coil, and a step of running a winding-finish end portion through a groove between the rib formed on the center and the rib formed on the rear side of the winding direction to connect electrically to the other terminal metal fitting.

11. A coil device comprising the bobbin for coil described in claim 9, a first electromagnetic coil formed on the outer peripheral portion of the barrel part of the first bobbin body, and a second electromagnetic coil formed on the outer peripheral portion of the barrel part of the second bobbin body.

12. A coil device comprising the bobbin for coil described in claim 8, a first electromagnetic coil formed on the outer peripheral portion of the barrel part of the first bobbin body, and a second electromagnetic coil formed on the outer peripheral portion of the barrel part of the second bobbin body.

13. A coil device comprising the bobbin for coil described in claim 1, a first electromagnetic coil formed on the outer peripheral portion of the barrel part of the first bobbin body, and a second electromagnetic coil formed on the outer peripheral portion of the barrel part of the second bobbin body.

14. The coil device according to claim 13, wherein the connector part has a first terminal metal fitting connected electrically to one end of a conductor wire configuring the first electromagnetic coil, a second terminal metal fitting connected electrically to the other end of the conductor wire configuring the first electromagnetic coil and one end of a conductor wire configuring the second electromagnetic coil, and a third terminal metal fitting connected electrically to the other end of the conductor wire configuring the second electromagnetic coil.

15. A solenoid comprising the coil device described in claim 14.

16. The coil device according to claim 13, wherein the first electromagnetic coil and the second electromagnetic coil are formed continuously with one conductor wire, the terminal metal fittings are configured by a pair of terminal metal fittings, and the conductor wire has one end connected electrically to one terminal metal fitting and the other end connected electrically to the other terminal metal fitting.

17. A solenoid comprising the coil device described in claim 16.

18. A solenoid comprising the coil device described in claim 13.

* * * * *